United States Patent
Kramlich et al.

(10) Patent No.: US 6,830,846 B2
(45) Date of Patent: Dec. 14, 2004

(54) DISCONTINUOUS CATHODE SHEET HALFCELL WEB

(75) Inventors: David C. Kramlich, St. Paul, MN (US); Alan P. Miller, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 216 days.

(21) Appl. No.: 09/997,944

(22) Filed: Nov. 29, 2001

(65) Prior Publication Data

US 2003/0099878 A1 May 29, 2003

(51) Int. Cl.[7] .................. H01M 10/36; H01M 10/40; H01M 4/40
(52) U.S. Cl. .................. 429/162; 429/149; 429/306; 429/231.1
(58) Field of Search .................. 429/162, 306, 429/452, 149, 231.1, 152

(56) References Cited

U.S. PATENT DOCUMENTS

| | | | |
|---|---|---|---|
| 4,118,024 A | 10/1978 | Gerhardt | |
| 4,543,863 A | 10/1985 | Rader | |
| 4,897,917 A | 2/1990 | Gauthier et al. | |
| 5,019,469 A | 5/1991 | Muller | |
| 5,100,746 A | 3/1992 | Muller et al. | |
| 5,104,116 A | 4/1992 | Pohjola | |
| 5,209,810 A | 5/1993 | Marschke | |
| 5,300,373 A | 4/1994 | Shackle | |
| 5,360,684 A | 11/1994 | Duval et al. | |
| 5,364,485 A | 11/1994 | Miura | |
| 5,480,087 A | 1/1996 | Young et al. | |
| 5,498,489 A | 3/1996 | Dasgupta et al. | |
| 5,514,232 A | 5/1996 | Burns | |
| 5,536,278 A | 7/1996 | St-Amant et al. | |
| 5,582,931 A | * 12/1996 | Kawakami | 429/162 X |
| 5,584,954 A | 12/1996 | Van der Klugt | |
| 5,618,318 A | 4/1997 | Reddy et al. | |
| 5,772,838 A | 6/1998 | Zablotny et al. | |
| 5,788,802 A | 8/1998 | Raney | |
| 5,879,489 A | 3/1999 | Burns et al. | |

FOREIGN PATENT DOCUMENTS

| | | |
|---|---|---|
| CA | 2093898 | 10/1994 |
| EP | 690 520 | 1/1996 |
| EP | 0814525 | 12/1997 |
| EP | 1 113 511 A1 | 4/2001 |
| JP | SHO-58-218753 | 12/1983 |
| JP | SHO 63-307670 | 12/1988 |
| JP | HEI 3-152881 | 6/1991 |
| JP | HEI 4-67577 | 4/1992 |
| JP | 97199175 | 7/1997 |
| JP | 98199545 | 7/1998 |
| JP | 99126602 | 5/1999 |
| JP | 99167930 | 6/1999 |
| JP | 94188030 | 7/1999 |
| JP | 99307087 | 11/1999 |
| JP | 99333350 | 12/1999 |
| JP | 99354110 | 12/1999 |
| JP | 00033315 | 2/2000 |
| JP | 00315518 | 11/2000 |

* cited by examiner

*Primary Examiner*—John S. Maples
(74) *Attorney, Agent, or Firm*—Mark A. Hollingsworth

(57) ABSTRACT

A unique discontinuous cathode sheet structure is incorporated within thin-film electrochemical halfcells and full cells. A thin-film electrochemical cell structure includes a cathode sheet layer comprising a series of discontinuous cathode sheets. In a monoface configuration, each of the cathode sheets includes one cathode layer in contact with a current collector layer. In a biface configuration, each of the cathode sheets includes a pair of cathode layers each contacting a current collector layer. A gap is defined between adjacent ones of the cathode sheets. A solid electrolyte layer contacts a surface of one or both cathode layers, depending on the configuration, and extends across the gaps defined between the adjacent cathode sheets. The cathode sheets may be arranged in a number of rows to define a matrix of the cathode sheets.

48 Claims, 9 Drawing Sheets

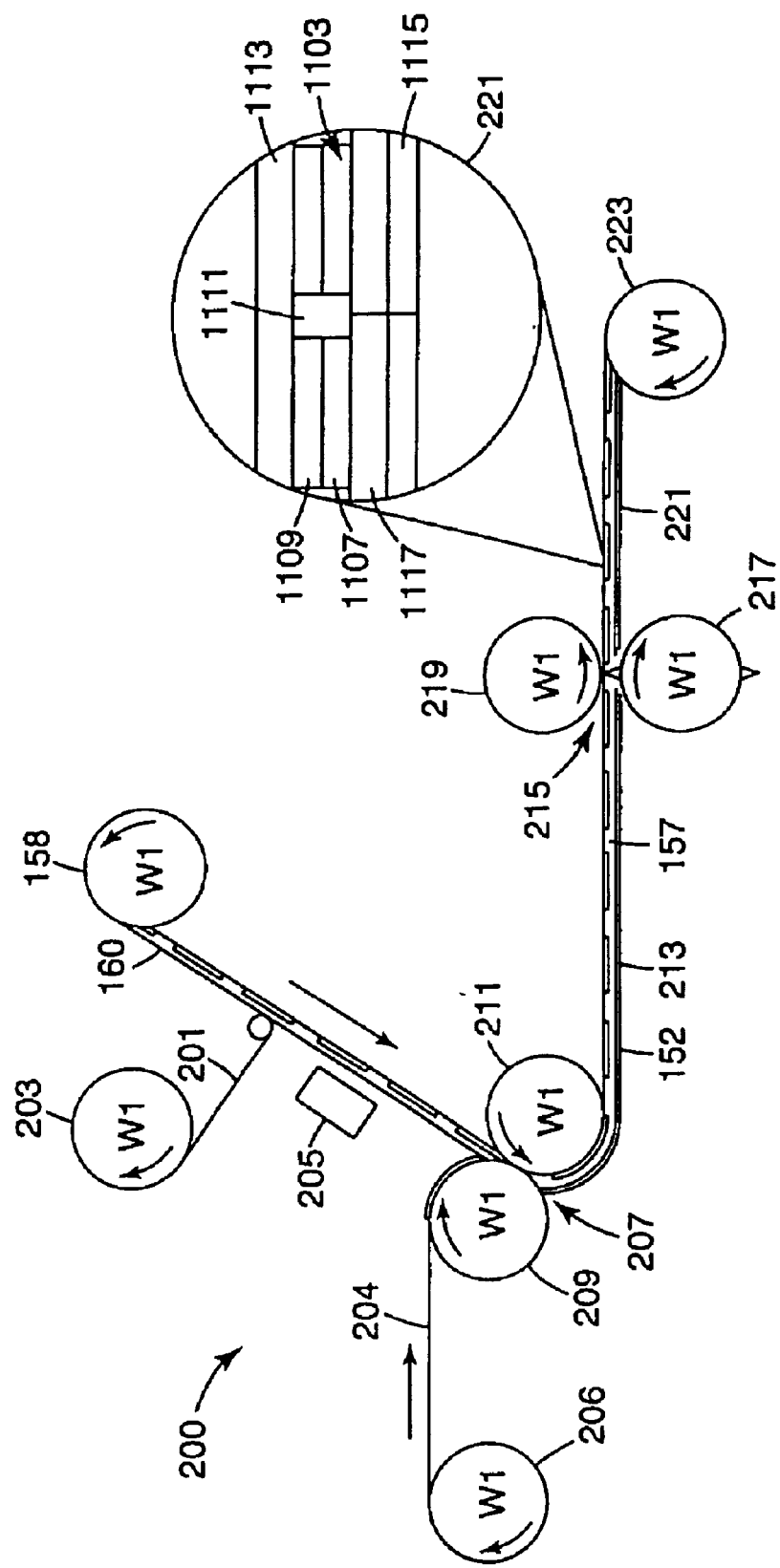

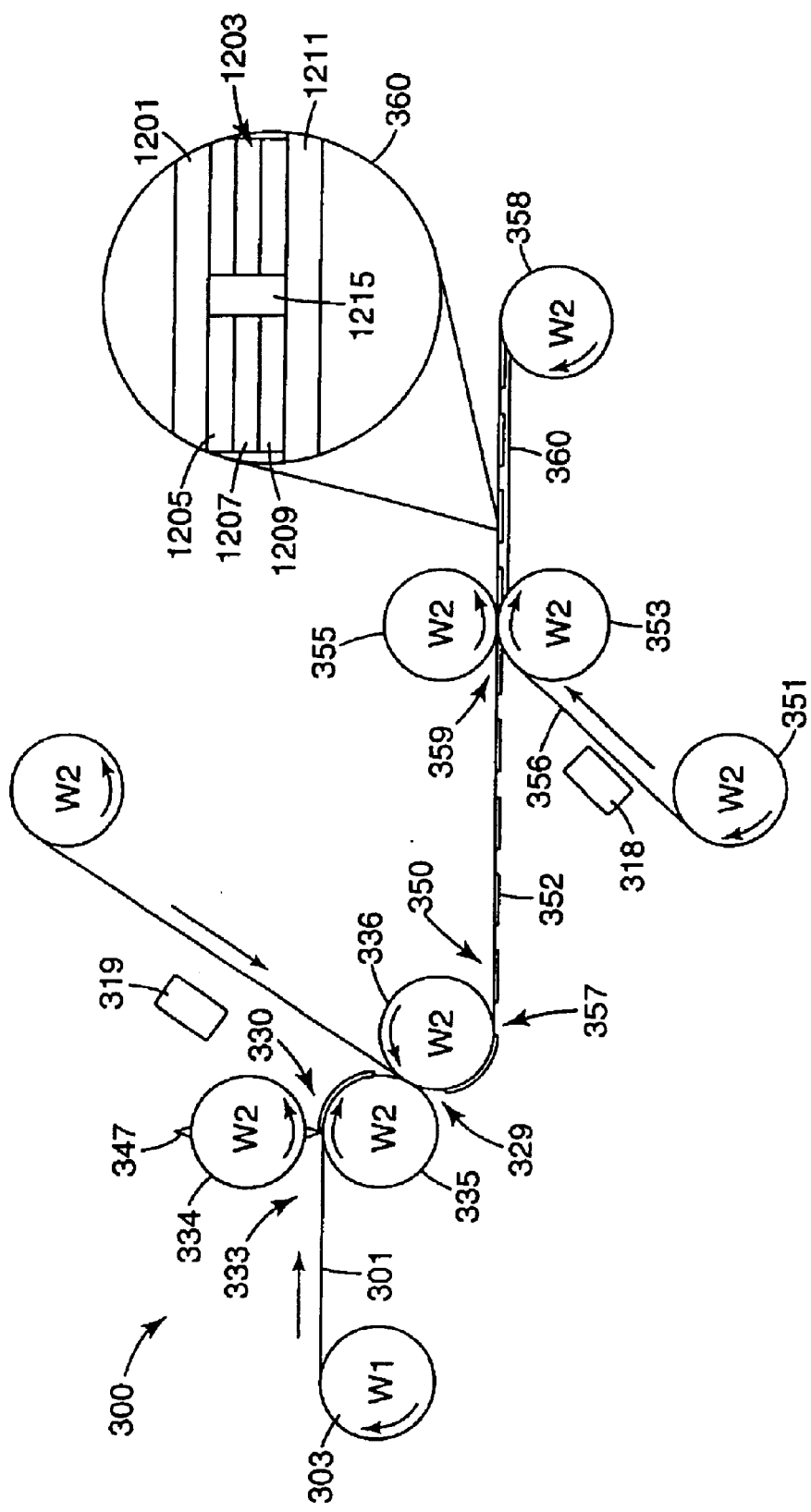

DISCONTINUOUS CATHODE SHEET HALFCELL WEB

FIELD OF THE INVENTION

This invention relates generally to thin-film electrochemical cells and, more particularly, to thin-film electrochemical cells that are formed using sheets of a discontinuous cathode structure and methods and apparatuses for producing same.

BACKGROUND OF THE INVENTION

Various lamination apparatuses and processes have been developed to produce electrochemical cells fabricated from thin-film materials. Many conventional lamination approaches employ a cutting mechanism that cuts a sheet of electrochemical cell material into small segments. The individual segments are then manually or mechanistically aligned and layered as part of a separate lamination process. The layered structure is then subjected to lamination forces by an appropriate force producing mechanism.

Notwithstanding the variety of conventional lamination and stacking approaches currently available, many of such approaches are not well suited for applications which require relatively high levels of productivity, automation, and flexibility. For example, many conventional lamination processes are unable to accommodate electrochemical cell materials of varying types, sheet sizes, and sheet shapes. Many of such available lamination techniques are not well suited nor adaptable to autonomously and continuously laminate multiple webs of differing materials, as is typically necessary in the construction of thin-film electrochemical laminate structures, for example.

There exists a need for an improved apparatus and method for laminating films and sheet materials of varying types, shapes, and sizes. There exists a particular need for an improved apparatus and method for laminating layers of electrochemical cell materials and for producing electrochemical half cells and unit cells for use in the construction of solid-state, thin-film batteries. The present invention fulfills these and other needs.

SUMMARY OF THE INVENTION

The present invention is directed to thin-film electrochemical halfcells and full cells that incorporate a unique discontinuous cathode sheet structure. The present invention is further directed to methods and apparatuses for producing same.

According to one embodiment of the present invention, a thin-film monoface electrochemical cell structure includes a cathode sheet layer comprising a series of discontinuous cathode sheets. Each of the cathode sheets includes a cathode layer and a current collector layer having a first surface contacting a first surface of the cathode layer. A gap is defined between adjacent ones of the cathode sheets. A solid electrolyte layer contacts a second surface of the cathode layer and extends across the gaps defined between the adjacent cathode sheets.

In one configuration, an electrical insulator layer contacts a second surface of the current collector layer. The electrical insulator layer extends across the gaps defined between the adjacent cathode sheets.

The solid electrolyte layer preferably encompasses a perimeter of each of the cathode layer of the cathode sheets. For example, the first edge of the solid electrolyte layer preferably extends beyond the first edge of the cathode layer, and a second edge of the solid electrolyte layer extends beyond a second edge of the cathode layer.

The current collector layer includes a first edge and a second edge, and the cathode layer includes a first edge and a second edge. The first edge of the current collector layer preferably extends beyond the first edge of the cathode layer and the first edge of the solid electrolyte layer, respectively. In one configuration, the second edge of the current collector layer extends beyond the second edge of the cathode layer and the second edge of the solid electrolyte layer.

In one arrangement, the series of discontinuous cathode sheets is arranged in a number of rows to define a matrix of the discontinuous cathode sheets. In such an arrangement, a first gap is provided in a transverse direction between adjacent discontinuous cathode sheets, and a second gap is provided in a longitudinal direction between adjacent rows of the discontinuous cathode sheets.

The cathode layer typically comprises a cathode active material, an electrically conductive material, an ionically conducting polymer, and an electrolyte salt. For example, the cathode layer can include a vanadium oxide material or a lithiated vanadium oxide material. In one particular embodiment, the cathode layer includes a cathode active material selected from the group consisting of $LiCoO_2$, $LiNiO_2$, $LiMn_2O_4$, $Li[M(1-x)Mnx]O_2$ where $0<x<1$ and M represents one or more metal elements, polyacetylene, polypyrrole, polyaniline, polythiophene, $MoS_2$, $MnO_2$, $TiS_2$, $NbSe_3$, $CuCl_2$, a fluorinated carbon, $Ag_2CrO_4$, $FeS_2$, $CuO$, $Cu_4O(PO_4)_2$, sulfur, and polysulfide.

The electrolyte layer preferably comprises a solid polymer electrolyte layer. In one configuration, the solid electrolyte layer comprises a random polyether copolymer of ethylene oxide and an ether oxide selected from the group consisting of propylene oxide, butylene oxide, and alkylglycidylether. In another configuration, the solid electrolyte layer comprises a crosslinked solid ionically conductive polymer comprising urethane groups, urea groups, thiocarbamate groups, or combinations thereof and inorganic particles.

In accordance with a further configuration, the solid electrolyte layer comprises a first surface and a second surface, such that the first surface of the solid electrolyte layer contacts the second surface of the cathode layer. The structure further includes an anode layer that contacts the second surface of the solid electrolyte layer. The anode layer preferably comprises lithium. An electrical insulator layer is typically included to contact a second surface of the current collector layer in this configuration.

According to another embodiment of the present invention, a thin-film biface electrochemical cell structure includes a cathode sheet layer comprising a series of discontinuous cathode sheets. Each of the cathode sheets includes a first cathode layer having a first surface and a second surface. A second cathode layer includes a first surface and a second surface. A current collector layer is disposed between the respective first surfaces of the first and second cathode layers. A gap is defined between adjacent ones of the cathode sheets. A first solid electrolyte layer contacts the second surface of the first cathode layer and extends across the gaps defined between the adjacent cathode sheets. A second solid electrolyte layer contacts the second surface of the second cathode layer and extends across the gaps defined between the adjacent cathode sheets. A biface cell structure according to this embodiment preferably include many of the features previously described with regard to a monoface cell structure.

In accordance with a further embodiment of the present invention, a method of producing a series of thin-film electrochemical cell structures involves cutting a web (cathode web), comprising a cathode layered structure, moving at a first speed into a series of cathode sheets. A web (electrolyte web) of a solid electrolyte is moved at a second speed equal to or greater than the first speed. Each of the cathode sheets moving at the first speed is laminated with the electrolyte web moving at the second speed to produce a first laminate structure having a space between adjacent cathode sheets. A web (third web) of a material is laminated with the first laminate structure such that the cathode sheets are disposed between the electrolyte web and the third web.

In accordance with a biface cell configuration, the material of the third web comprises a solid electrolyte. According to a monoface cell configuration, the material of the third web comprises an electrical insulator.

Cutting the cathode web preferably involves rotatably cutting the cathode web. Laminating each of the cathode sheets preferably involves rotatably laminating each of the cathode sheets with the electrolyte web. Laminating the third web of the material preferably involves rotatably laminating the third web of the material with the first laminate structure.

According to one approach, cutting the cathode web involves cutting a portion of the cathode web and removing excess cathode web. The space between adjacent cathode sheets in this case is a function of one or both of a size and shape of the removed excess cathode web.

The cathode web, according to one configuration, comprises a number of down-web directed rows of the cathode layered structure. Cutting the cathode web in this case involves cutting the cathode web in a cross-web direction to produce a matrix of the cathode sheets.

Each of the cathode sheets is defined by a length, and cutting the cathode web involves cutting the cathode web with a rotary die, such that the length of each cathode sheet is a function of the first speed of cathode web movement relative to the second speed of the rotary die. The length of each cathode sheet can also be a function of the first speed of cathode web movement relative to a circumferential die blade spacing and the second speed of the rotating die blade.

The space or gap between adjacent cathode sheets is a function of the first speed of cathode web movement relative to the second speed of the electrolyte web. For example, cutting the cathode web typically involves cutting the cathode web with at least one rotating die blade separated by a circumferential blade spacing (D). The space (S) between adjacent cathode sheets in this case is a function of the first speed (W1) of cathode web movement relative to the circumferential die blade spacing (D) and the second speed (W2) of the rotary die blade. The space (S) between adjacent cathode sheets, in this case, is characterized by an equation $S=D((W2/W1)-1)$.

The lamination method according to this embodiment may further involve laminating a web (lithium web) of lithium material with the electrolyte web. This method further involves cutting through the lithium web, third web, and electrolyte web at respective locations in alignment with the space between adjacent cathode sheets. Cutting through the respective lithium, third, and electrolyte webs preferably involves rotatably cutting through the respective lithium, third, and electrolyte webs. The electrolyte web may further include a carrier web. Cutting through the respective lithium, third, and electrolyte webs in this case involves rotatably cutting through the respective lithium, third, and electrolyte webs but not cutting entirely through the carrier web.

In accordance with another embodiment of the present invention, an apparatus for producing a series of thin-film electrochemical cell structures includes a first feed station that feeds a web (cathode web), comprising a cathode layered structure, at a first speed. A rotary cutting station receives the cathode web from the first feed station and rotatably cuts the cathode web, moving at the first speed, into a series of cathode sheets. A second feed station feeds an electrolyte web at a second speed greater than or equal to the first speed. A first rotary lamination station receives the electrolyte web and the cathode web. The first rotary lamination station rotatably laminates each of the cathode sheets moving at the first speed with the electrolyte web moving at the second speed to produce a first laminate structure having a space between adjacent cathode sheets. A third feed station feeds a web (third web) of a material. A second rotary lamination station receives the third web and the first laminate structure. The second rotary lamination station rotatably laminates the third web with the first laminate structure such that the cathode sheets are disposed between the electrolyte web and the third web.

The cathode web, according to one configuration, includes a number of down-web directed rows of the cathode layered structure. The rotary cutting station in this case cuts the cathode web in a cross-web direction to produce a matrix of the cathode sheets. The material of the third web may comprise an electrical insulator or a solid electrolyte.

In general terms, the space between adjacent cathode sheets is typically a function of the first speed of cathode web movement relative to the second speed of the electrolyte web. More specifically, each of the cathode sheets is defined by a length, and the rotary cutting station comprises a rotary die. The length of each cathode sheet in this case is a function of the first speed of cathode web movement relative to the second speed of the rotary die. The rotary cutting station, for example, includes a rotary die. The rotary die includes at least one rotary die blade separated by a circumferential blade spacing (D). The space (S) between adjacent cathode sheets is a function of the first speed (W1) of cathode web movement relative to the circumferential die blade spacing (D) and the second speed (W2) of the rotary die. The space (S) between adjacent cathode sheets is characterized by an equation $S=D((W2/W1)-1)$ in this case.

According to yet another embodiment of the present invention, an apparatus for producing a series of thin-film electrochemical cell structures includes a first feed station that feeds a half-cell web at a first speed. The half-cell web comprises a cathode sheet layer comprising a series of spaced cathode sheets disposed between a solid electrolyte layer and a third layer. The solid electrolyte and third layers respectively extend across gaps defined between the spaced cathode sheets. A second feed station feeds a web (lithium web) of lithium material. A rotary lamination station receives the half-cell web and lithium web. The first rotary lamination station rotatably laminates the half-cell web with the lithium web to produce a unit cell structure. A cutting station receives the unit cell structure. The cutting station cuts through the unit cell structure at respective locations in alignment with the gaps defined between the spaced cathode sheets to produce a cut unit cell structure.

The cutting station typically includes a rotary die that rotatably cuts through the unit cell structure at the respective locations in alignment with the gaps defined between the spaced cathode sheets. The electrolyte web may include a carrier web, in which case the cutting station cuts through the respective lithium, third, and electrolyte webs, but does not cut entirely through the carrier web.

The cathode web, according to one configuration, includes a number of down-web directed rows of the cathode layered structure, in which case the rotary cutting station cuts the cathode web in a cross-web direction to produce a matrix of the cathode sheets.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 8 illustrates a second rotary converting apparatus for laminating a DCS monoface halfcell with a lithium film in accordance with an embodiment of the present invention;

FIG. 9 illustrates a first rotary converting apparatus for producing a DCS biface halfcell which excludes one or more carrier webs in accordance with an embodiment of the present invention;

Figure 1:
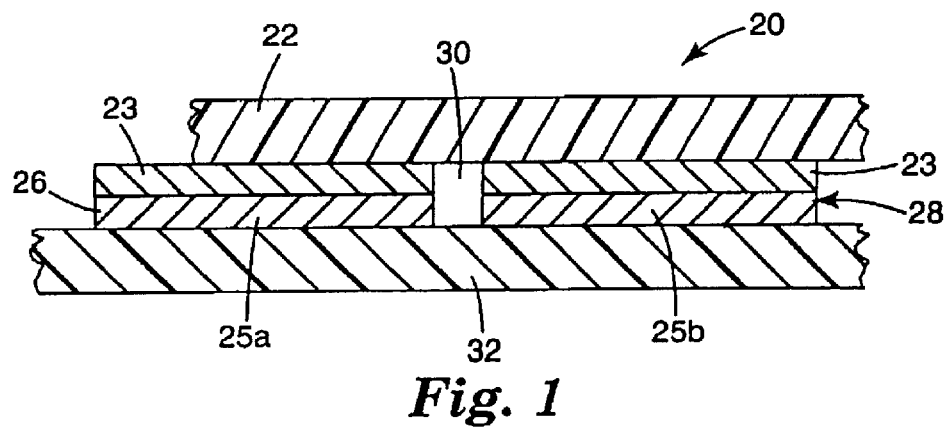
FIG. 1 is a cross-sectional view of an electrochemical halfcell which incorporates a discontinuous cathode sheet (DCS) structure having a monoface configuration in accordance with an embodiment of the present invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

Rotary converting lamination apparatuses and methods of the present invention advantageously provide for the production thin-film electrochemical halfcells and full cells that incorporate a unique discontinuous cathode sheet (DCS) structure. The principles of the present invention may be applied to produce monoface and biface DCS structures, such as those useful in thin-film electrochemical generators.

Articles of manufacture, rotary converting lamination apparatuses, and rotary converting methods according to the present invention provide for an electrochemical cell structure that enables cuttings of a lithium layer between cathode sheet structures that have been separated by a gap of a specified size during fabrication. Cutting the lithium layer within gaps provided between adjacent cathode sheet structures significantly reduces or eliminates occurrences of shorts due to cut edge abnormalities, resulting from the lithium and cathode being cut at different times in different planes.

Also, articles of manufacture and rotary converting lamination apparatuses and methods of the present invention advantageously provide for the incorporation of a solid polymer electrolyte that completely encapsulates and seals the cathode, thus eliminating the need for edge treatments, such as strips for example. Embodiments of the present invention provide for compliance with the so-called Lithium Edge Rule, whereby the cathode has electrolyte and lithium projecting beyond all four edges, which reduces the occurrences of failure due to dendrites. These and other advantages are realizable by employing rotary converting lamination apparatuses, methods, and articles of the present invention.

Figure 2:
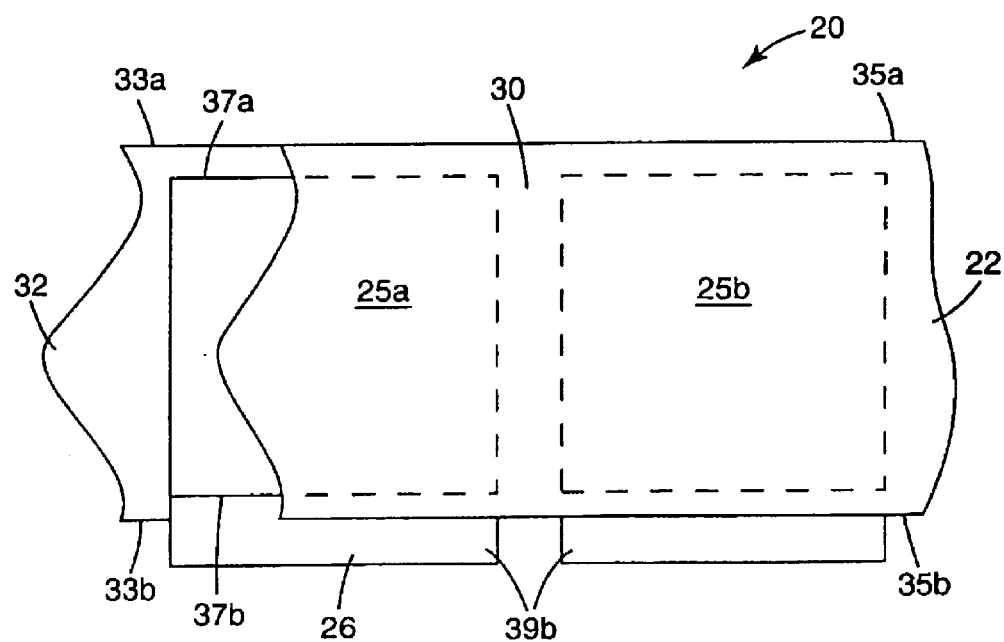
FIG. 2 is a top view of the electrochemical halfcell structure shown in FIG. 1.

Referring now to the Figures, there is shown in FIG. 1 a cross-sectional view of an electrochemical halfcell structure 20 which incorporates a discontinuous cathode sheet structure in accordance with an embodiment of the present invention. FIG. 2 is a top view of the electrochemical halfcell structure 20 shown in FIG. 1. The electrochemical halfcell structure 20 shown in FIGS. 1 and 2 represents a monoface halfcell configuration which incorporates a discontinuous cathode sheet structure of the present invention.

According to the monoface halfcell embodiment depicted in FIGS. 1 and 2, cathode sheet structures 25a, 25b are situated between a layer 22 of an electrolyte material and a layer 32 of an insulator material. Individual cathode sheet structures 25a, 25b are situated in a spaced relationship to define a discontinuous cathode sheet (DCS) layer 28, which is sandwiched between the electrolyte and insulator layers 22, 32.

In accordance with the monoface halfcell configuration depicted in FIGS. 1 and 2, the DCS layer 28 includes a cathode layer 23 and a current collector 26. The cathode layer 23 has an upper surface in contact with a lower surface of the electrolyte layer 22. A lower surface of the cathode layer 23 is in contact with an upper surface of the current collector 26. A lower surface of the current collector 26 contacts an upper surface of the insulator layer 32. It can be seen in FIG. 1 that a gap 30 is formed between adjacent cathode sheet structures 25a, 25b of the DCS layer 28.

The top view of FIG. 2 illustrates additional details of an electrochemical halfcell configuration according to an embodiment of the present invention. As is shown in FIG. 2, opposing edges 33a, 33b of the insulator layer 32 extend beyond opposing edges 37a, 37b of the cathode layer 23 of each cathode sheet structure 25a, 25b. As can further be seen in FIG. 2, opposing edges 35a, 35b of the electrolyte layer 22 extend beyond opposing edges 37a, 37b of the cathode layer 23 of each cathode sheet structure 25a, 25b.

Typically, opposing edges 33a, 33b of the insulator layer 32 are vertically aligned with opposing edges 35a, 35b of the electrolyte layer 22. In one configuration, one edge 39a of the current collector 26 does not extend beyond edges 33a, 35a of the insulator and electrolyte layers 32, 22, respectively. This edge 39a of the current collector 26 is typically in vertical alignment with edges 33a, 35a of the insulator and electrolyte layers 32, 22, respectively. In another configuration, such as that shown in FIG. 5 for example, edge 39a of the current collector 26 extends beyond edges 33a, 35a of the insulator and electrolyte layers 32, 22, respectively. In one preferred configuration, an edge 39b of the current collector 26 extends beyond edges 33b, 35b of the insulator and electrolyte layers 32, 22, respectively.

Figure 3:
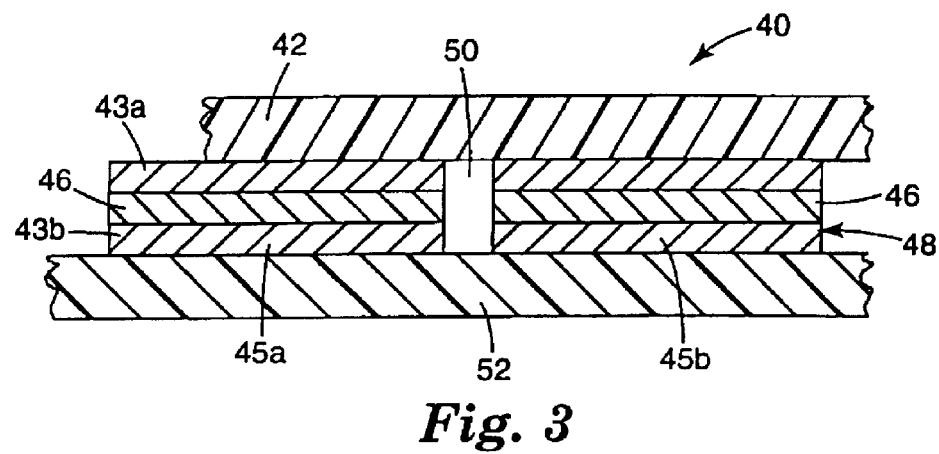
FIG. 3 is a cross-sectional view of an electrochemical halfcell which incorporates a DCS structure having a biface configuration in accordance with an embodiment of the present invention.
Figure 4:
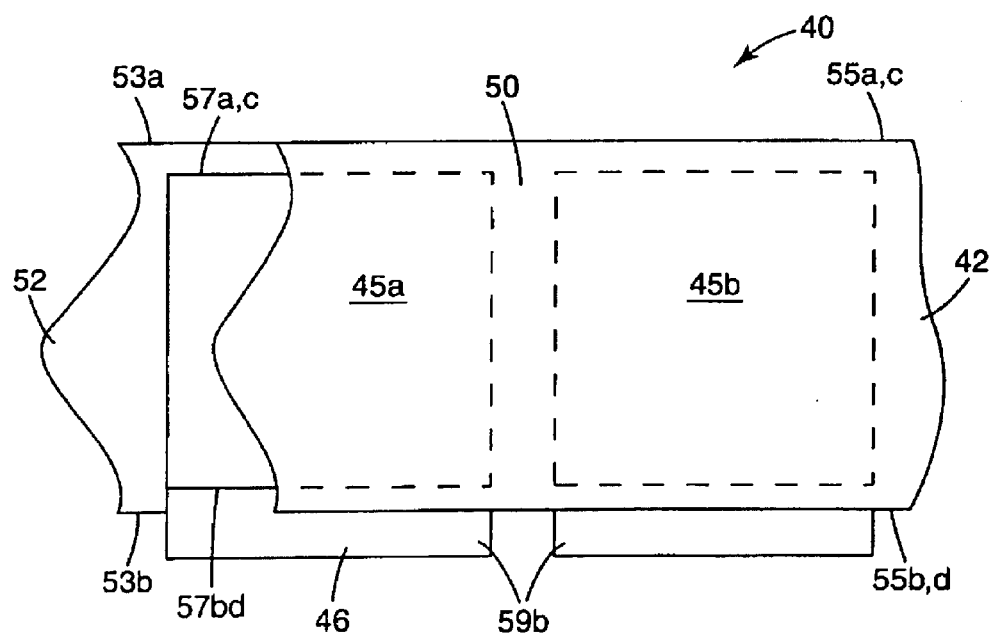
FIG. 4 is a top view of the electrochemical halfcell shown in FIG. 3.

Turning now to FIGS. 3 and 4, cross-sectional and top views are provided of an electrochemical halfcell structure 40 which incorporates a discontinuous cathode sheet structure in accordance with another embodiment of the present invention. The electrochemical halfcell structure 40 shown in FIGS. 3 and 4 represents a biface halfcell configuration which incorporates a discontinuous cathode sheet structure of the present invention.

In accordance with the biface halfcell embodiment depicted in FIGS. 3 and 4, cathode sheet structures 45a, 45b are situated between a top layer 42 of an electrolyte material and a bottom layer 52 of an electrolyte material. Typically, layers 42 and 52 are formed of the same electrolyte material. Individual cathode sheet structures 45a, 45b are situated in a spaced relationship to define a DCS layer 48, which is sandwiched between the top and bottom electrolyte layers 42, 52.

According to the biface halfcell configuration depicted in FIGS. 3 and 4, the DCS layer 48 includes a top cathode layer 43a, a current collector 46, and a bottom cathode layer 43b. In this configuration, a single current collector 46 is sandwiched between top and bottom cathode layers 43a, 43b, hence the term biface DCS layer configuration.

The top cathode layer 43a has an upper surface in contact with a lower surface of the top electrolyte layer 42. A lower surface of the top cathode layer 43a is in contact with an upper surface of the current collector 46. A lower surface of the current collector 46 contacts an upper surface of the bottom cathode layer 43b. A lower surface of the bottom cathode layer 43b is in contact with an upper surface of the bottom electrolyte layer 52. As in the monoface configuration illustrated in FIGS. 1 and 2, it can be seen in the biface configuration depicted in FIGS. 3 and 4 that a gap 50 is formed between adjacent cathode sheet structures 45a, 45b of the DCS layer 48.

Additional details of a DCS biface halfcell configuration according to an embodiment of the present invention can be seen in FIG. 4. As is shown in FIG. 4, opposing edges 53a, 53b of the bottom electrolyte layer 52 extend beyond respective opposing edges 57a,c and 57b,d of the top and bottom cathode layers 43a, 43b of each cathode sheet structure 45a, 45b. As can further be seen in FIG. 4, opposing edges 55a, 55b of the top electrolyte layer 42 extend beyond respective opposing edges 57a,c and 57b,d of the top and bottom cathode layers 43a, 43b of each cathode sheet structure 45a, 45b.

Typically, opposing edges 53a, 53b of the bottom electrolyte layer 52 are vertically aligned with opposing edges 55a, 55b of the top electrolyte layer 42. In one configuration, one edge 59a of the current collector 46 does not extend beyond edges 53a, 55a of the top and bottom electrolyte layers 42, 52, respectively. This edge 59a of the current collector 46 is typically in vertical alignment with edges 53a, 55a of the top and bottom electrolyte layers 42, 52, respectively. In another embodiment, such as that shown in FIG. 6 for example, edge 59a of the current collector 46 extends beyond edges 53a, 55a of the top and bottom electrolyte layers 42, 52, respectively. In one preferred configuration, a second edge 59b of the current collector 46 extends beyond edges 53b, 55b of the top and bottom electrolyte layers 42, 52, respectively.

FIGS. 5 and 6 illustrate another configuration of a DCS layer in which the DCS cathode layer comprises a two-dimensional matrix of cathode sheet structures. In one arrangement, the two-dimensional matrix includes cathode sheet structures arranged in a windowpane fashion. According to this embodiment, the cathode layer is discontinuous in the cross-web and down-web directions. In this case, the current collector extends beyond the electrolyte layer(s) on both sides. However, there is a discontinuity at the mid-point of the current collector in the down-web direction.

Figure 5A:
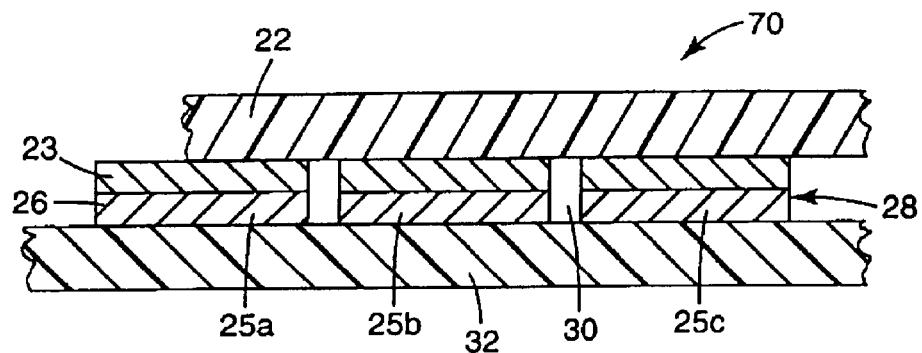
FIG. 5 illustrates another configuration of a DCS structure in which the DCS cathode layer comprises a two-dimensional matrix of cathode sheets each having a monoface configuration.
Figure 5B:
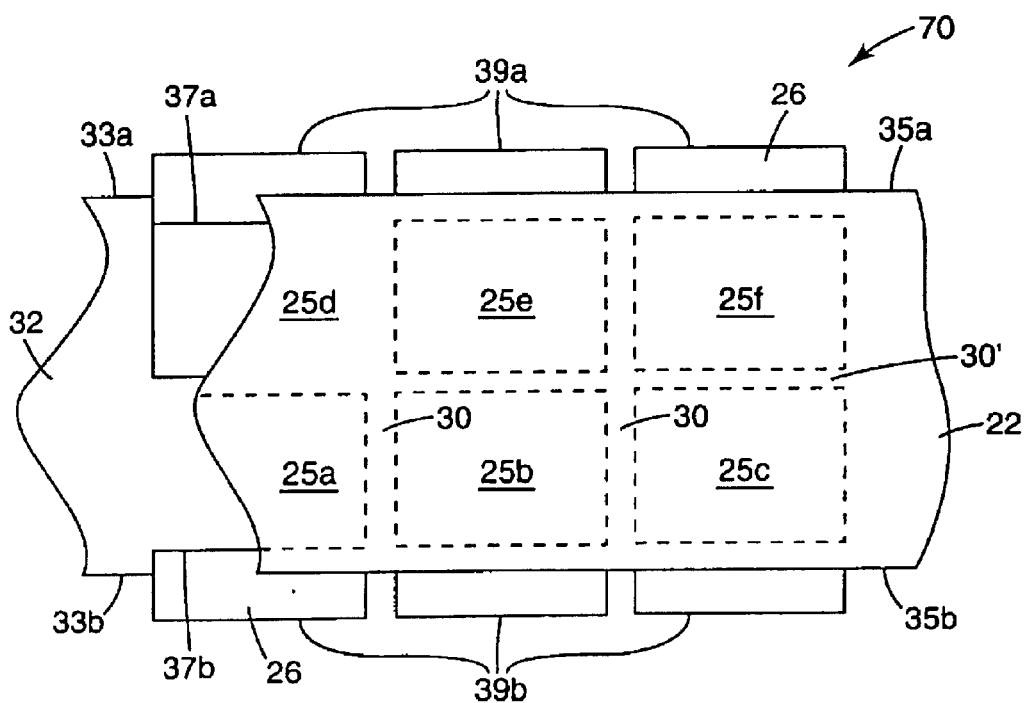

With particular reference to FIGS. 5A and 5B, there is illustrated a cross-sectional view of a DCS monoface double-wide halfcell 70 in accordance with an embodiment of the present invention. According to this embodiment, cathode sheet structures 25a–25c are situated in a parallel aligned relationship in the down-web direction with cathode sheet structures 25d–25f. A gap 30' is provided between the two rows of cathode sheet structures 25a–25c and 25d–25f. The gap 30' can range between 0 inches and about 0.63 inches. A gap 30 can range between about 0.015 inches and about 0.4 inches, as discussed previously. The cathode sheet structures 25a–25f are sandwiched between electrolyte layer 22 and insulator layer 32.

In this arrangement, an edge 39b of the current collector 26 of cathode sheet structures 25a–25c respectively extends beyond edges 33b, 35b of the insulator and electrolyte layers 32, 22, respectively. An edge 39a of the current collector 26 of cathode sheet structures 25d–25f respectively extends beyond edges 33a, 35a of the insulator and electrolyte layers 32, 22, respectively. It is understood that the cathode sheet structures 25 according to this embodiment may be arranged in more than two rows, such as three or four rows, with a gap 30' provided between each of the rows.

Figure 6A:
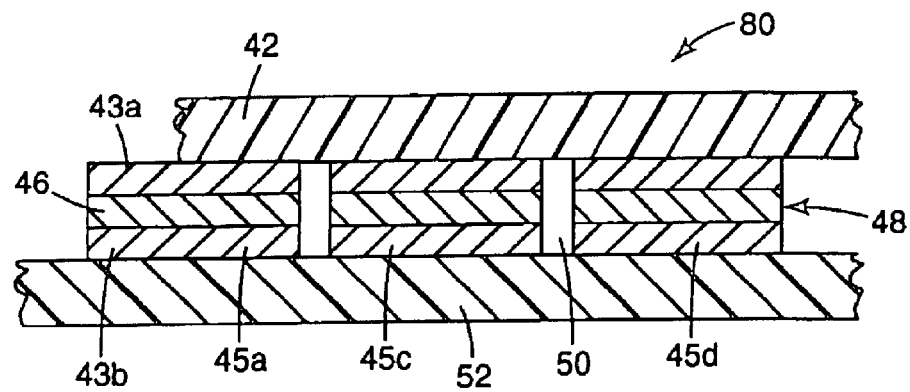
FIG. 6 illustrates yet another configuration of a DCS structure in which the DCS cathode layer comprises a two-dimensional matrix of cathode sheets each having a biface configuration.
Figure 6B:
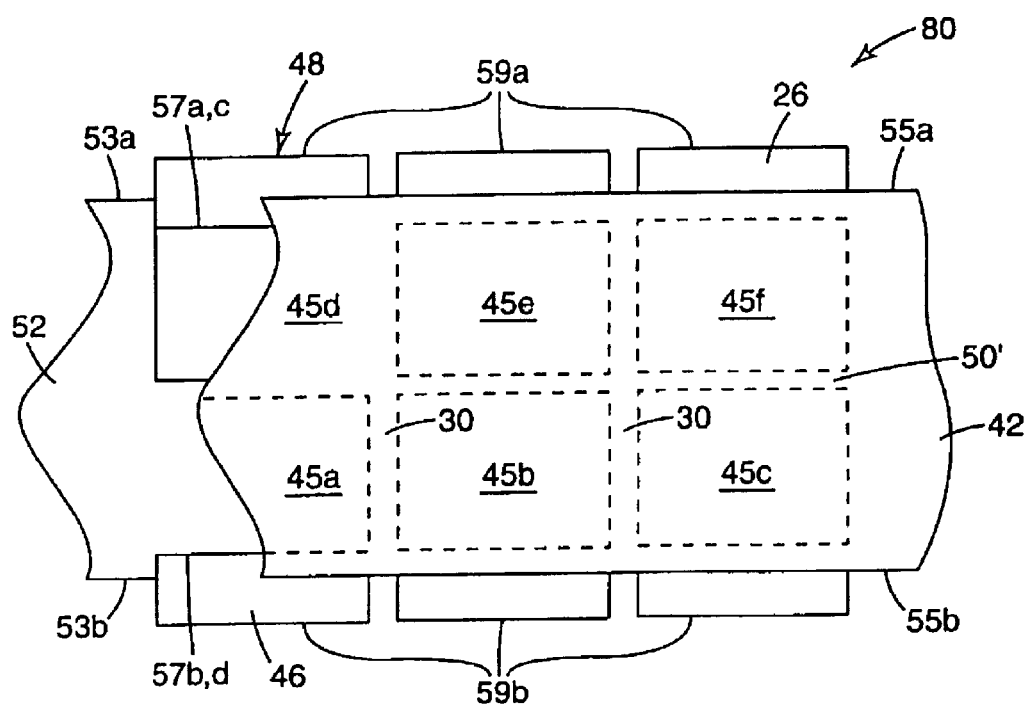

Concerning FIGS. 6A and 6B, there is illustrated a cross-sectional view of a DCS biface double-wide halfcell 80 in accordance with an embodiment of the present invention. According to this embodiment, cathode sheet structures 45a–45c are situated in a parallel aligned relationship in the down-web direction with cathode sheet structures 45d–45f. A gap 50' is provided between the two rows of cathode sheet structures 45a–45c and 45d–45f. The gap 50' can range between 0 inches and about 0.63 inches. A gap 50 can range between about 0.015 inches and about 0.4 inches, as discussed previously. The cathode sheet structures 45d–45f are sandwiched between top electrolyte layer 42 and bottom electrolyte layer 52.

In this arrangement, an edge 59b of the current collector 46 of cathode sheet structures 45a–45c respectively extends beyond edges 53b, 55b of the top and bottom electrolyte layers 42, 52, respectively. An edge 59a of the current collector 46 of cathode sheet structures 45d–45f respectively extends beyond edges 53a, 55a of the top and bottom electrolyte layers 42, 52, respectively. It is understood that the cathode sheet structures 45 according to this embodiment may be arranged in more than two rows, such as three or four rows, with a gap 50' provided between each of the rows.

In accordance with particular non-limiting embodiments of the present invention, the various layers and features of the DCS monoface and biface halfcell configurations shown in FIGS. 1–5 may have the following dimensions. It is understood that the dimensions discussed herein are provided for purposes of illustration only, and are not to be regarded as exhaustive or limiting.

In general, the cathode sheet structures 25, 45 can have a width that ranges between about 0.75 inches and about 24 inches. A length of the cathode sheet structures 25, 45 can range between about 0.25 inches and about 24 inches. As previously discussed, the gap 30, 50 defined between adjacent cathode sheet structures 25, 45 ranges between about 0.015 inches and about 0.4 inches. In a double-wide configuration, a gap 30', 50' between parallel rows of cathode sheet structures can range between 0 inches and about 0.63 inches.

In a monoface configuration, such as that shown in FIGS. 1, 2, and 5, the edges 35a, 35b of the electrolyte layer 22 and edges 33a, 33b of the insulator layer 32 can extend beyond edges 37a and 37b of the cathode layer 23 by between about 0.04 inches and about 0.31 inches. In a biface configuration, such as that shown in FIGS. 3, 4, and 6, the edges 55a, 55b of the top electrolyte layer 42 and edges 53a, 53b of the bottom electrolyte layer 52 can respectively extend beyond edges 57a,c and 57b,d of the top and bottom cathode layers 43a and 43b by between about 0.04 inches and about 0.31 inches.

Edge 39b of the current collector 26, in a monoface configuration, can extend beyond edge 37b of the cathode layer 23 by between about 0.08 inches and about 0.51 inches. In a biface configuration, edge 59b of the current collector 46 can extend beyond edges 57b,d of the top and bottom cathode layers 43a and 43b by between 0.08 inches and about 0.51 inches.

In accordance with the monoface configuration depicted in FIG. 5, edge 39a of the current collector 26 can extend beyond edge 37a of the cathode layer 23 by between 0 inches and about 0.315 inches. In a biface configuration of the type shown in FIG. 6, edge 59a of the current collector 46 can extend beyond edges 57a,c of the top and bottom cathode layers 43a and 43b by between about 0.08 inches and about 0.51 inches.

In a monoface configuration, such as that shown in FIGS. 1 and 2, edge 39b of the current collector 26 extends beyond edge 35b of the electrolyte layer 22 by between about 0.04 inches and about 0.35 inches. In a biface configuration, such as that shown in FIGS. 3 and 4, edge 59b of the current collector 46 extends beyond edges 55b, 53b of the top and bottom electrolyte layers 42, 52 by between about 0.04 inches and about 0.35 inches.

In the monoface configuration of the embodiment shown in FIG. 5B, edge 39a of the current collector 26 extends beyond edge 35a of the electrolyte layer 22 by between about 0.04 inches and about 0.35 inches. In a biface configuration of the type depicted in FIG. 6B, edge 59a of the current collector 46 extends beyond edges 55a, 53a of the top and bottom electrolyte layers 42, 52 by between about 0.04 inches and about 0.35 inches.

According to one embodiment of the present invention, cathode layers 23, 43a, and 43b comprise a cathode active material, an electrically conductive material, an ionically conducting polymer, and an electrolyte salt. In one particular embodiment, cathode layers 23, 43a, and 43b comprise a vanadium oxide material or a lithiated vanadium oxide material.

In accordance with a further embodiment, cathode layers 23, 43a, and 43b comprise a cathode active material selected from the group consisting of $LiCoO_2$, $LiNiO_2$, $LiMn_2O_4$, $Li[M(1-x)Mnx]O_2$ where $0<x<1$ and M represents one or more metal elements, polyacetylene, polypyrrole, polyaniline, polythiophene, $MoS_2$, $MnO_2$, $TiS_2$, $NbSe_3$, $CuCl_2$, a fluorinated carbon, $Ag_2CrO_4$, $FeS_2$, $CuO$, $Cu_4O(PO_4)_2$, sulfur, and polysulfide. Additional aspects of this embodiment are disclosed in commonly owned U.S. patent application Ser. No. 09/845,178, filed Apr. 27, 2001, entitled "Improved Cathode Compositions for Lithium Ion Batteries," the content of which is hereby incorporated herein by reference in its entirety.

In one embodiment of the present invention, the electrolyte layers 22, 42, 52 preferably comprise a solid polymer electrolyte layer. According to one particular embodiment, the electrolyte layers 22, 42, 52 comprise a random polyether copolymer of ethylene oxide and an ether oxide selected from the group consisting of propylene oxide, butylene oxide, and alkylglycidylether. Additional aspects of this embodiment are disclosed in U.S. Pat. No. 4,758,483, the content of which is hereby incorporated herein by reference in its entirety.

In another embodiment, the electrolyte layers 22, 42, 52 comprise a crosslinked solid ionically conductive polymer comprising urethane groups, urea groups, thiocarbamate groups, or combinations thereof and inorganic particles. Additional aspects of this embodiment are disclosed in commonly owned U.S. application filed Oct. 24, 2001, entitled "Crosslinked Polymer Electrolyte Compositions," and identified under the content of which is hereby incorporated herein by reference in its entirety.

A thin-film electrochemical cell which incorporates a DCS structure according to the present invention is preferably constructed using a two stage process. The first stage involves a first rotary converting process by which a DCS halfcell web is produced. A cathode web is cut at a specific interval and then laminated to an over-sped web of a solid polymer electrolyte to create a specified gap between adjacent cathode sheets. In the production of a biface DCS structure, another web of a solid polymer electrolyte is laminated over the exposed cathode sheets to produce a DCS biface halfcell web. In the production of a monoface DCS structure, a web of an electrical insulator is laminated over the exposed cathode sheets to produce a DCS monoface halfcell web.

The second stage involves a second rotary converting process by which a previously produced DCS halfcell web (monoface or biface) is laminated with a lithium film to produce a DCS unit cell web. The web of DCS unit cell sheets is subsequently cut within the gaps formed between adjacent cathode sheets to produce a web of unit cell sheets. The unit cell sheets are subsequently stacked to form a multi-layer, prismatic electrochemical cell. Exemplary stacking apparatuses and methods are disclosed in commonly owned U.S. patent application Ser. No. 09/718,549, filed Nov. 22, 2000, entitled "Stacking Apparatus and Method for Laminated Products and Packaging," the content of which is hereby incorporated herein by reference in its entirety.

Figures 7A, 7B:
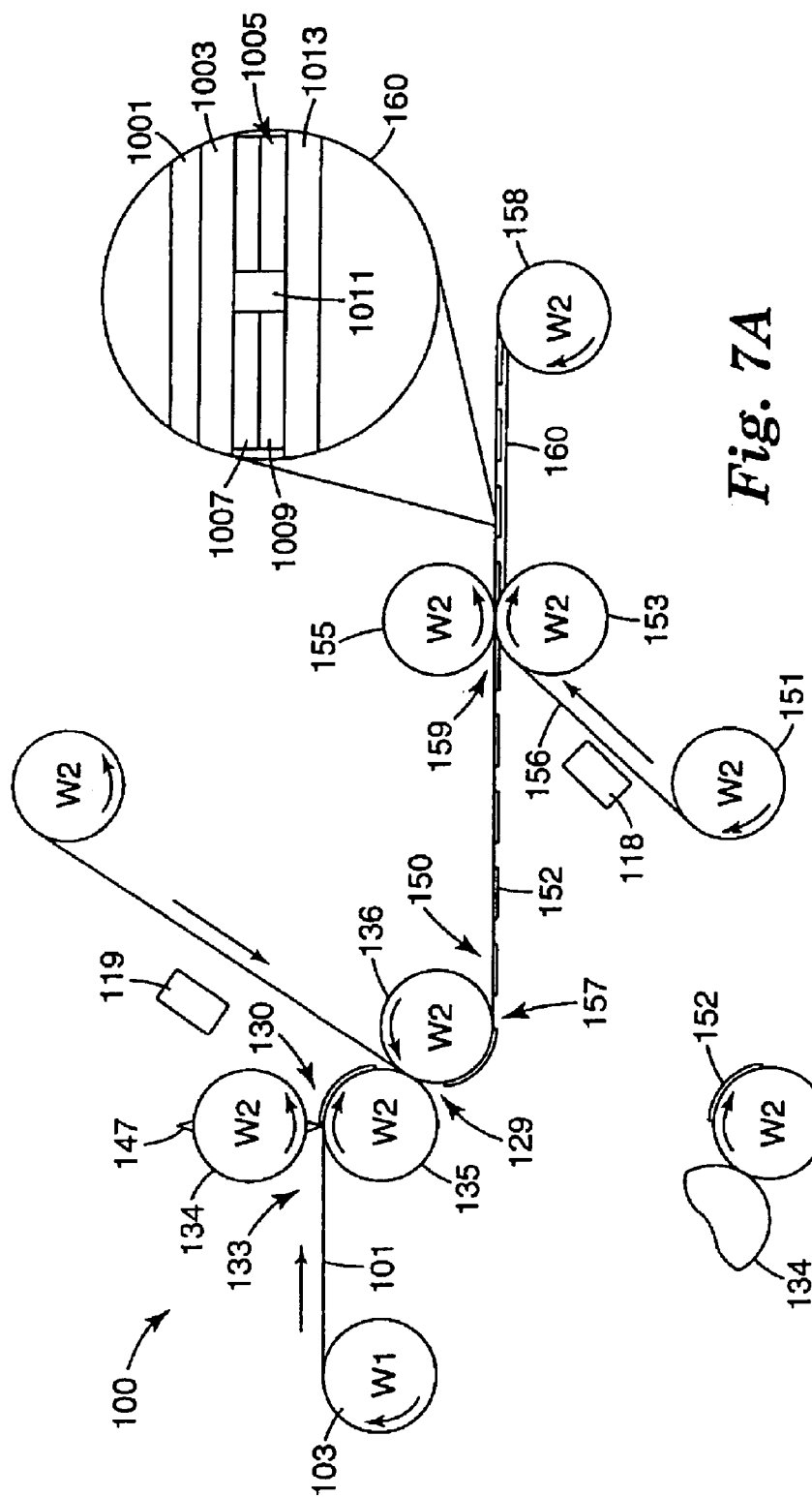
FIG. 7 illustrates a first rotary converting apparatus for producing a DCS monoface halfcell in accordance with an embodiment of the present invention.

Turning now to FIG. 7A, there is illustrated an apparatus 100 for producing a DCS monoface halfcell web according to an embodiment of the present invention. The rotary converting apparatus 100 depicted in FIG. 7A processes a web 101 of cathode material having a monoface configuration, which is initially wound on a cathode feed roll 103. As wound, the monoface cathode web 101 may include a release liner which, during unwinding of the cathode feed roll 103, is wound onto a liner take-up roll (not shown). The monoface cathode web 101, absent the release liner, if present, is fed to a first cutting station 133. The monoface cathode web 101 may pass through a tension roll apparatus (not shown), which places the cathode web 101 into a desired state of tension and which may include a web guiding mechanism.

In the embodiment shown in FIG. 7A, the first cutting station 133 represents a rotary die station. A cutting roll apparatus 130 cuts the monoface cathode web 101 into individual cathode sheets. The cutting roll apparatus 130 includes a rotary die 134 and anvil 135. Movement, such as speed and/or acceleration, of the rotary die 134 and anvil 135 is typically regulated by a servo control system (not shown).

In an alternative configuration, the first cutting station 133 may further include a driven pull roll apparatus (not shown), which includes a nip roll and a rubber-covered drive roll. Alternatively, a vacuum pull roll apparatus may be used. The movement, such as speed and/or acceleration, of the pull roll apparatus is typically regulated by a servo control system as is known in the art. The pull roll apparatus feeds the monoface cathode web 101 to the cutting roll apparatus 130.

As is also shown in FIG. 7A, a web of electrolyte material 123 is fed from a feed roll 121 to a first lamination apparatus 129. The electrolyte web 123 is preferably over-sped relative to the monoface cathode web 101, although the speed of the two webs 123, 101 may be substantially equal in accordance with one particular embodiment. The electrolyte web 123 may be heated by an infrared heater 119. The electrolyte web 123 typically includes a carrier liner or web. The electrolyte web 123 is typically placed into a desired degree of tension via a tension roll apparatus (not shown) and is typically guided.

The monoface cathode web 101 is fed into the first cutting station 133 wherein the rotary die 134 and anvil 135 cooperate to cut the cathode web 101 into cathode sheets 152 of a desired length determined in part by the spacing between die blade(s) 147. The monoface cathode sheets 152 are rotated by the anvil 135 into proximity with the electrolyte web 123 within the first lamination apparatus 129. The cathode sheets 152 are laminated with the electrolyte web 123 at a nip formed between a lamination roll 136 and the anvil roll 135 to produce a laminated web 150 of electrolyte 123/spaced DCS monoface cathode sheets 152. The lamination roll 136 is typically covered with a rubber material and the anvil 135 is typically fabricated from a metal material.

According to one embodiment of the present invention, the electrolyte web 123 is moved through the first lamination apparatus 129 at a speed greater than that of the monoface cathode web 101. This difference in relative speeds of the electrolyte and cathode webs 123, 101 creates a space 157 between the cathode sheets 152 as each cathode sheet 152 is laminated with the electrolyte web 123.

In accordance with another embodiment, the speeds associated with the electrolyte and cathode webs 123, 101 are substantially equal, such as speed W1 in this illustrative example. A patterned rotary die 134, such as rotary die which includes a rectangular shaped die blade 147, may be employed. According to this configuration, a rectangular die blade 147 cuts a rectangular shaped cut into the monoface cathode web 101 which, when removed, creates a gap 157 between adjacent cathode sheets 152. The excess or waste web matrix material may be rewound on the liner moving at speed W1 by use of wind roll (not shown).

The laminated web 150 of electrolyte 123/spaced DCS monoface cathode sheets 152 is laminated to a web 156 of an insulator material by a second lamination apparatus 159. The second lamination apparatus 159 includes a pair of lamination rolls 153, 155. The lamination rolls 153, 155 are typically covered with a rubber material. The insulator web 156 is fed from a feed roll 151 and may be heated by an infrared heater 118. The insulator web 156 is laminated with web 150 at a nip formed between the pair of lamination rolls 153, 155 to produce a DCS monoface halfcell web 160.

The DCS monoface halfcell web 160, in accordance with the embodiment depicted in the exploded view in FIG. 7A, incorporates a discontinuous cathode sheet structure 1005 which includes a series of cathode and current collector layers 1007, 1009 separated by gaps 1011/157. The discontinuous cathode sheet structure 1005 is sandwiched between an electrolyte layer 1003 and an insulator layer 1013. In this embodiment, a carrier web 1001 contacts the electrolyte layer 1003.

The DCS monoface halfcell web 160 is wound on a roll 158. The roll 158 may be stored for subsequent use in the production of a DCS unit cell web during a second rotary converting process. Alternatively, the web 160 can be fed directly to a second rotary converting apparatus as part of a continuous rotary converting operation.

In accordance with one embodiment, and as is further shown in FIG. 7A, the monoface cathode web 101 is moved into the cutting roll apparatus 130 at a speed W1. The cutting roll apparatus 130, shown as including rotary die 134 and anvil 135, is controlled to move at a speed W2, which is greater than the speed W1 of the cathode web 101.

The die blades 147 provided on rotary die 134, in cooperation with the anvil 135, cut through the monoface cathode web 101 to produce individual cathode sheets 152 (shown in greater detail in FIG. 7B). It is understood that rotary die 134 may include a single die blade, dual die blades, as is shown in FIG. 7A, or greater than two die blades. Further, die blade 147 may be a single blade or a more complex blade arrangement. For example, a rectangular die blade arrangement or pattern may be provided on rotary die 134. It will be appreciated that other methods and apparatuses for cutting or stamping the cathode web 101 may be employed depending on a given system implementation, which may include the use of a shearing apparatus, laser, or water jet, for example.

In one embodiment, the anvil 135 is a vacuum anvil roll having a hole spacing pattern that is matched to the sheeting die blade spacing. The individual monoface cathode sheets 152, transitioning from moving at speed W1 of the cathode web 101 to speed W2, are then fed to the lamination apparatus 129.

The lamination roll 136 and anvil 135 of the lamination apparatus 129, and hence the electrolyte web 123, are shown moving at the speed W2. The individual cathode sheets 152, also moving at the speed W2, are laminated with the electrolyte web 123 at the nip formed between the rubber-covered lamination roll 136 and the anvil 135. The difference between speeds W1 and W2, where speed W2 is greater than speed W1, creates a space 157 between adjacent cathode sheets 152 during the lamination process. The laminated web 150, supported by a release liner/carrier web of the electrolyte web 123, is then fed to the second lamination apparatus 159.

In many applications, a suitable speed ratio of the faster moving electrolyte web 123 relative to the slower moving monoface cathode web 101 (i.e., W2/W1) may vary between about 1.005 to about 1.05. For example, the speed W1 of the cathode web 101 may range between about 5 feet per minute (fpm) and about 500 fpm, and the speed W2 of the electrolyte web 123 may vary between about 5.025 fpm and about 525 fpm, as long as W2/W1>1.

In one embodiment, the width of the monoface cathode web 101 varies between about 0.75 inches and about 24 inches. The width of the electrolyte web 123 may also vary between about 0.75 inches and about 24 inches. The length of each cathode sheet 152 may be varied between about 0.25 inches and about 24 inches. The spaces 157 created between adjacent cathode sheets may range between about 0.015 inches and about 0.4 inches. In an embodiment in which a lamination offset is created between the cathode sheets 152 and electrolyte web 123 during the lamination process, such a lamination offset may vary between about 0.04 inches and about 0.31 inches.

For purposes of illustration and not of limitation, an exemplary set of rotary converting process parameters are provided. In this illustrative example, it is assumed that the cathode web 101 is moved at a speed W1 of 50 fpm. The speed W2 of the electrolyte web 123 is 51 fpm. Accordingly, this differential in web speeds provides for a speed ratio of W2 to W1 of about 1.02.

FIG. 8 illustrates the second stage for processing a DCS monoface halfcell web previously produced by the apparatus and process described above with regard to FIG. 7. The second processing stage involves a second rotary converting apparatus 200 which laminates a roll 158 of a previously produced DCS monoface halfcell web 160 with a lithium film 204 to produce a DCS monoface unit cell web 221.

According to the embodiment shown in FIG. 8, a roll 158 of a previously produced DCS monoface halfcell web 160 is fed to a lamination apparatus 207 which includes a pair of lamination rolls 209, 211. In a configuration in which the monoface halfcell web 160 includes a carrier web 201, this carrier web 201 is separated from the monoface halfcell web 160 and wound onto a carrier rewind roll 203. The monoface halfcell web 160, absent carrier web 201, may pass by an infrared heater 205 and into the lamination apparatus 207.

A film 204 of lithium is fed from a feed roll 206 to the lamination apparatus 207, where the pair of lamination rolls 209, 211 laminate the lithium film 204 with the monoface halfcell web 160 to produce a DCS monoface unit cell web 213.

The web 213 of DCS monoface unit cell sheets is fed to a cutting station 215 which includes a rotary die 217 and an anvil 219. The rotary die 217 and anvil 219 cut the DCS monoface unit cell web 213 within the gaps 157 formed between adjacent cathode sheets 152 to produce a web 221 of DCS monoface unit cell sheets.

The web 221 of DCS monoface unit cell sheets, in accordance with the embodiment depicted in the exploded view in FIG. 8, incorporates a discontinuous cathode sheet structure 1103 which includes a series of cathode and current collector layers 1107, 1109 separated by gaps 1111/157. The discontinuous cathode sheet structure 1103 is sandwiched between an electrolyte layer 1117 and an insulator layer 1113. A lithium layer 1115 contacts the electrolyte layer 1117.

As is further shown in the exploded view in FIG. 8, the rotary die 217 and anvil 219 cooperate to cut through the lithium and electrolyte layers 1115, 1117 at web locations registered with respect to the gaps 1111/157 separating adjacent cathode sheets 152. The cutting blade(s) of rotary die 217, however, do not cut through the insulator layer 1113.

An optical sensor (not shown) can be employed to detect the spaces 157 between adjacent cathode sheets 152 for purposes of ensuring that cuts in the laminated web 213 are made only within these spaces. It is noted that alignment of the space or gap between adjacent cathode sheets 152 at the appropriate cutting location within the cutting station 215 may be determined by use of proper timing, gearing, and/or belting, rather than by optical or other gap sensing or detecting. The web 221 of DCS monoface unit cell sheets is wound onto a roll 223 and subsequently removed.

In the above-described process, the various rolls shown in FIG. 8 are preferably operating at the same speed, W1. The roll 223 may later be loaded onto a stacking apparatus, where the unit cell sheets are stacked to form a multi-layer, prismatic electrochemical cell. Alternatively, the web 221 can be fed directly to a stacking apparatus as part of a continuous rotary converting/stacking operation of the type described in previously incorporated U.S. patent application Ser. No. 09/718,549 entitled "Stacking Apparatus and Method for Laminated Products and Packaging."

Referring now to FIG. 9, there is illustrated an apparatus 300 for producing a DCS biface halfcell web according to an embodiment of the present invention. The rotary converting apparatus 300 depicted in FIG. 9 shares features common to the rotary converting apparatus 100 shown in FIG. 7A. As such, many of these common features will not be described or will be described summarily in the following discussion of the apparatus 300 shown in FIG. 9.

The rotary converting apparatus 300 illustrated in FIG. 9 includes a web 301 of biface cathode material initially wound on a cathode feed roll 303. The biface cathode web 301 may include a release liner which, during unwinding of the cathode feed roll 303, is wound onto a liner take-up roll (not shown). The biface cathode web 301, absent the release liner, if present, is fed to a first cutting station 333.

The first cutting station 333 represents a rotary die station which includes a cutting roll apparatus 330 that cuts the biface cathode web 301 into individual cathode sheets. The cutting roll apparatus 330 includes a rotary die 334 and anvil 335.

A web of electrolyte material 323 is fed from a feed roll 321 to a 30 first lamination apparatus 329. In the embodiment shown in FIG. 9, the electrolyte web 323 does not include a carrier liner or web. The electrolyte web 323 is preferably over-sped relative to the biface cathode web 301, although the speed of the two webs 323, 301 may be substantially equal in accordance with the one particular embodiment described previously with respect to processing of a monoface cathode web. The electrolyte web 323 may be heated by an infrared heater 319.

The biface cathode web 301 is fed into the first cutting station 333 wherein the rotary die 334 and anvil 335 cooperate to cut the cathode web 301 into cathode sheets 352. The biface cathode sheets 352 are rotated by the anvil 335 into proximity with the electrolyte web 323 within the first lamination apparatus 329. The cathode sheets 352 are laminated with the electrolyte web 323 at a nip formed between a lamination roll 336 and the anvil roll 335 to produce a laminated web 350 of electrolyte 323/spaced DCS biface cathode sheets 352.

In one embodiment, the electrolyte web 323 is moved through the first lamination apparatus 329 at a speed greater than that of the biface cathode web 301 to create a space 357 between the cathode sheets 352 as each cathode sheet 352 is laminated with the electrolyte web 323. In another embodiment, the speeds associated with the electrolyte and cathode webs 323, 301 are substantially equal, and a patterned rotary die 334 may be employed to create spaces of a desired size and shape between adjacent cathode sheets.

The laminated web 350 of electrolyte 323/spaced DCS biface cathode sheets 352 is laminated to a web 356 of an electrolyte material by a second lamination apparatus 359. The electrolyte of web 356 is typically the same as that of web 323. The second lamination apparatus 359 includes a pair of lamination rolls 353, 355. The electrolyte web 356 is fed from a feed roll 351 and may be heated by an infrared heater 318. The electrolyte web 356 is laminated with web 350 at a nip formed between the pair of lamination rolls 353, 355 to produce a DCS biface halfcell web 360.

The DCS biface halfcell web 360, in accordance with the embodiment depicted in the exploded view in FIG. 9, incorporates a discontinuous cathode sheet structure 1203 which includes a series of cathode/current collector/cathode layers 1205, 1207, 1209 separated by gaps 1215/357. The discontinuous cathode sheet structure 1203 is sandwiched between electrolyte layers 1201 and 1211.

The DCS biface halfcell web 360 is wound on a roll 358. The roll 358 may be stored for subsequent use in the production of a DCS biface unit cell web during a second rotary converting process. Alternatively, the web 360 can be fed directly to a second rotary converting apparatus as part of a continuous rotary converting operation.

Figure 10:
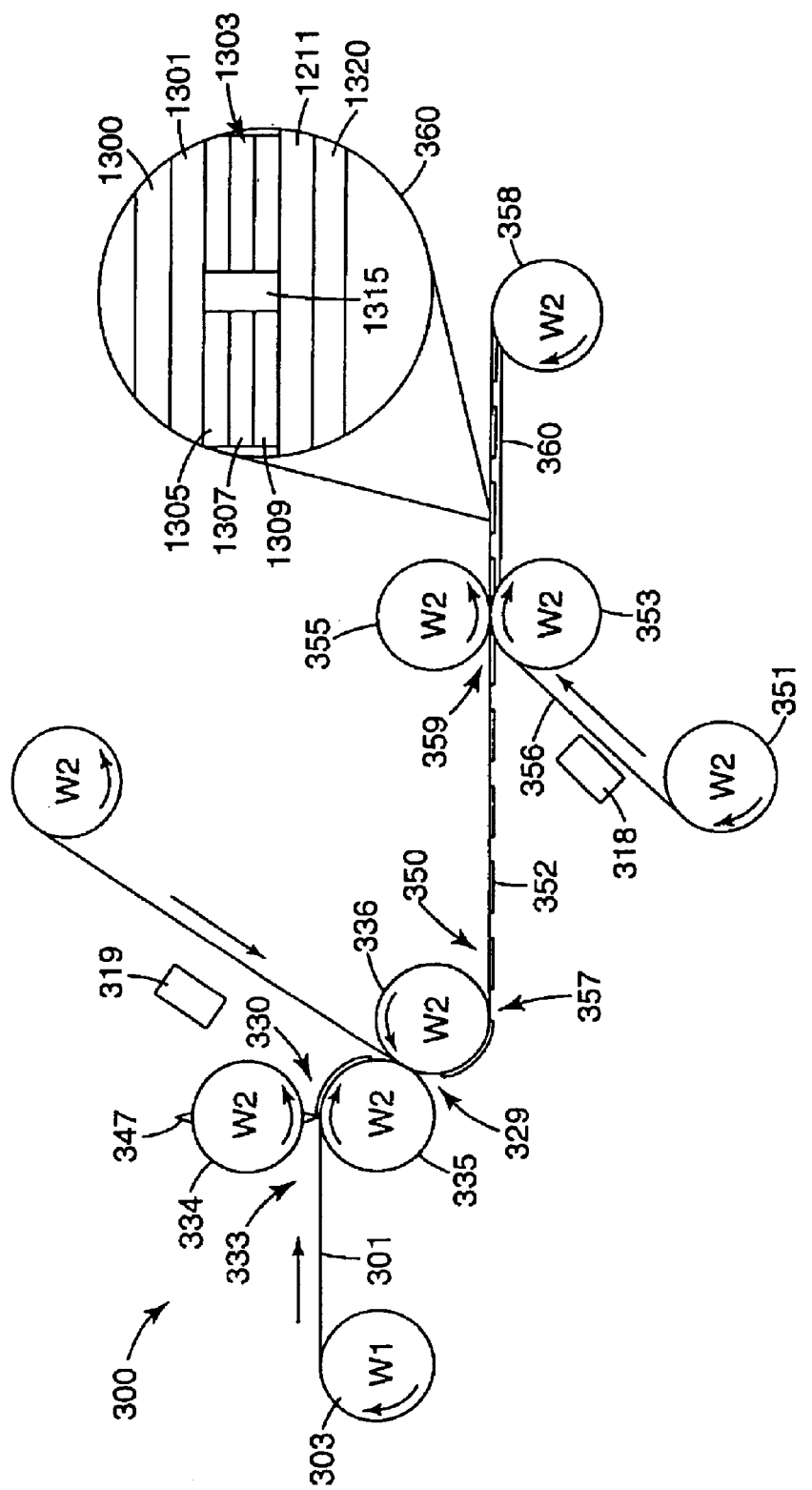
FIG. 10 illustrates a first rotary converting apparatus for producing a DCS biface halfcell which includes carrier webs in accordance with an embodiment of the present invention.

FIG. 10 illustrates an apparatus 300 for producing a DCS biface halfcell web according to another embodiment of the present invention. According to this embodiment, the electrolyte web 323, in addition to electrolyte material, includes a carrier web or liner. Further, the electrolyte web 356 also includes a carrier web or liner. As such, the DCS biface halfcell web 360 according to this embodiment has a configuration as shown in the exploded view provided in FIG. 10.

As is shown in the exploded view of FIG. 10, the DCS biface halfcell web 360 incorporates a discontinuous cathode sheet structure 1303 which includes a series of cathode/current collector/cathode layers 1305, 1307, 1309 separated by gaps 1315/357. The discontinuous cathode sheet structure 1303 is sandwiched between electrolyte layers 1301 and 1311. A first carrier web 1300 contacts electrolyte layer 1301 and a second carrier web 1320 contacts electrolyte layer 1311.

Figure 11:
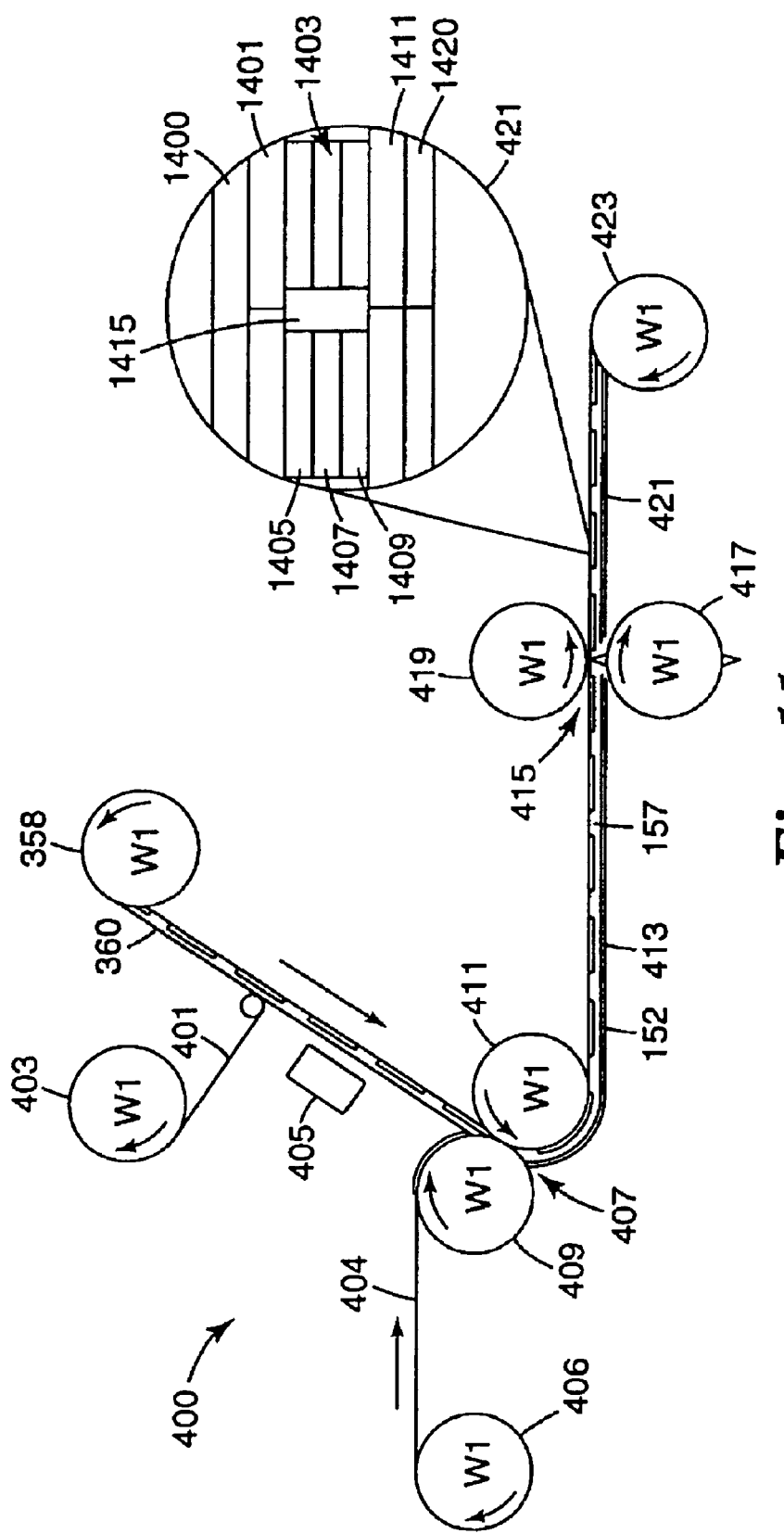
FIG. 11 illustrates a second rotary converting apparatus for laminating a DCS biface halfcell with a lithium film in accordance with an embodiment of the present invention.

FIG. 11 illustrates the second stage for processing a DCS biface halfcell web previously produced by the apparatus and process described above with regard to FIGS. 9 and 10. The rotary converting apparatus 400 depicted in FIG. 11 shares features common to the rotary converting apparatus 200 shown in FIG. 8. As such, many of these common features will not be described or will be described summarily in the following discussion of the apparatus 400 shown in FIG. 11.

The second processing stage depicted in FIG. 11 involves a second rotary converting apparatus 400 which laminates a roll 358 of a previously produced DCS biface halfcell web 360 with a lithium film 404 to produce a DCS biface unit cell web 421, one embodiment of which is illustrated in the exploded view provided in FIG. 11.

According to the embodiment shown in FIG. 11, a roll 358 of a previously produced DCS biface halfcell web 360, sandwiched between opposing carrier webs according to one embodiment, is fed to a lamination apparatus 407 which includes a pair of lamination rolls 409, 411. The carrier web 401 provided with the DCS biface halfcell web 360 is separated from the biface halfcell web 360 and wound onto a carrier rewind roll 403. The biface halfcell web 360, absent carrier web 401, may pass by an infrared heater 405 and into the lamination apparatus 407.

A film 404 of lithium is fed from a feed roll 406 to the lamination apparatus 407, where the pair of lamination rolls 409, 411 laminate the lithium film 404 with the biface halfcell web 360 to produce a DCS biface unit cell web 413. The DCS biface unit cell web 413 is fed to a cutting station 415 which includes a rotary die 417 and an anvil 419.

The rotary die 417 and anvil 419 cooperate to cut the DCS biface unit cell web 413 within the gaps 157 formed between adjacent cathode sheets 152 to produce a web 421 of DCS biface unit cell sheets. As is shown in the exploded view of FIG. 11, the web 421 of DCS biface unit cell sheets incorporates a discontinuous cathode sheet structure 1403 which includes a series of cathode/current collector/cathode layers 1405, 1407, 1409 separated by gaps 1415/157. The discontinuous cathode sheet structure 1403 is sandwiched between electrolyte layers 1401 and 1411. A carrier web 1400 contacts electrolyte layer 1401. A lithium layer 1420 contacts electrolyte layer 1411.

As is further shown in the exploded view in FIG. 11, the rotary die 417 and anvil 419 cooperate to cut through the lithium and electrolyte layers 1420, 1411, 1401 at web locations registered with respect to the gaps 1415/157 separating adjacent cathode sheets 152. The cutting blade(s) of rotary die 417, however, do not cut through the carrier web 1400.

The web 421 of DCS biface unit cell sheets is wound onto a roll 423 and subsequently removed. The roll 423 may later be loaded onto a stacking apparatus, where the unit cell sheets are stacked to form a multi-layer, prismatic electrochemical cell. Alternatively, the web 421 can be fed directly to a stacking apparatus as part of a continuous rotary converting/stacking operation.

The foregoing description of the various embodiments of the invention has been presented for the purposes of illustration and description. For example, features of the present invention may be enhanced, supplemented, or modified as described in commonly owned U.S. patent application Ser. No. 09/718,584, filed Nov. 22, 2000, entitled "Rotary Converting Apparatus and Method for Laminated Products and Packaging," the content of which is hereby incorporated herein by reference in its entirety. It is not intended to be exhaustive or to limit the invention to the precise form disclosed. Many modifications and variations are possible in light of the above teaching. It is intended that the scope of the invention be limited not by this detailed description, but rather by the claims appended hereto.

What we claim is:

1. A thin-film electrochemical cell structure, comprising:
   a cathode sheet layer comprising a series of discontinuous cathode sheets, each of the cathode sheets comprising:
      a cathode layer; and
      a current collector layer having a first surface contacting a first surface of the cathode layer;
   a gap defined between adjacent ones of the cathode sheets; and
   a solid electrolyte layer contacting a second surface of the cathode layer and extending across the gaps defined between the adjacent cathode sheets.

2. The structure of claim 1, further comprising an electrical insulator layer contacting a second surface of the current collector layer.

3. The structure of claim 2, wherein the electrical insulator layer extends across the gaps defined between the adjacent cathode sheets.

4. The structure of claim 1, wherein the electrolyte layer comprises a solid polymer electrolyte layer.

5. The structure of claim 1, wherein the gap defined between adjacent cathode sheets ranges between about 0.015 inches and about 0.4 inches.

6. The structure of claim 1, wherein a width of the cathode sheets ranges between about 0.75 inches and about 24 inches.

7. The structure of claim 1, wherein a length of the cathode sheets ranges between about 0.25 inches and about 24 inches.

8. The structure of claim 1, wherein the solid electrolyte layer encompasses a perimeter of the cathode layer of each of the cathode sheets.

9. The structure of claim 1, wherein the solid electrolyte layer comprises a first edge and a second edge, and each of the cathode sheets comprises a first edge and a second edge, the first and second edges of the solid electrolyte layer extending beyond the first and second edges of each cathode sheet by between about 0.04 inches and about 0.31 inches.

10. The structure of claim 1, wherein the current collector layer comprises a first edge and a second edge, and the cathode layer comprises a first edge and a second edge, the first edge of the current collector layer extending beyond the first edge of the cathode layer.

11. The structure of claim 10, wherein the first edge of the current collector layer extends beyond the first edge of the cathode layer by between about 0.08 inches and about 0.51 inches.

12. The structure of claim 10, wherein the second edge of the current collector layer extends beyond the second edge of the cathode layer by between about 0.0 inches and about 0.3 15 inches.

13. The structure of claim 1, wherein the series of discontinuous cathode sheets is arranged in a plurality of rows to define a matrix of the discontinuous cathode sheets, and a gap defined between adjacent rows ranges between 0 inches and about 0.63 inches.

14. The structure of claim 1, wherein the solid electrolyte layer comprises a first edge, the current collector layer comprises a first edge, and the cathode layer comprises a first edge, the first edge of the current collector layer extending beyond both the first edge of the cathode layer and the first edge of the solid electrolyte layer.

15. The structure of claim 14, wherein the first edge of the current collector layer extends beyond the first edge of the solid electrolyte layer by between about 0.04 inches and about 0.35 inches.

16. The structure of claim 14, wherein the first edge of the solid electrolyte layer extends beyond the first edge of the cathode layer.

17. The structure of claim 14, wherein a second edge of the solid electrolyte layer extends beyond a second edge of the cathode and current collector layers, respectively.

18. The structure of claim 1, wherein the cathode layer comprises a cathode active material, an electrically conductive material, an ionically conducting polymer, and an electrolyte salt.

19. The structure of claim 1, wherein the cathode layer comprises a vanadium oxide material or a lithiated vanadium oxide material.

20. The structure of claim 1, wherein the cathode layer comprises a cathode active material selected from the group consisting of $LiCoO_2$, $LiNiO_2$, $LiMn_2O_4$, $Li[M(1-x)Mnx]O_2$ where $0<x<1$ and M represents one or more metal elements, polyacetylene, polypyrrole, polyaniline, polythiophene, $MoS_2$, $MnO_2$, $TiS_2$, $NbSe_3$, $CuCl_2$, a fluorinated carbon, $Ag_2CrO_4$, $FeS_2$, $CuO$, $Cu_4O(PO_4)_2$, sulfur, and polysulfide.

21. The structure of 1, wherein the solid electrolyte layer comprises a random polyether copolymer of ethylene oxide and an ether oxide selected from the group consisting of propylene oxide, butylene oxide, and alkylglycidylether.

22. The structure of 1, wherein the solid electrolyte layer comprises a crosslinked solid ionically conductive polymer comprising urethane groups, urea groups, thiocarbamate groups, or combinations thereof and inorganic particles.

23. The structure of claim 1, wherein the solid electrolyte layer comprises a first surface and a second surface, the first surface of the solid electrolyte layer contacting the second surface of the cathode layer, the structure further comprising an anode layer contacting the second surface of the solid electrolyte layer.

24. The structure of claim 23, wherein the anode layer comprises lithium.

25. The structure of claim 23, further comprising an electrical insulator layer contacting a second surface of the current collector layer.

26. A thin-film electrochemical cell structure, comprising:
  a cathode sheet layer comprising a series of discontinuous cathode sheets, each of the cathode sheets comprising:
    a first cathode layer comprising a first surface and a second surface;
    a second cathode layer comprising a first surface and a second surface; and
    a current collector layer disposed between the respective first surfaces of the first and second cathode layers;
  a gap defined between adjacent ones of the cathode sheets;
  a first solid electrolyte layer contacting the second surface of the first cathode layer and extending across the gaps defined between the adjacent cathode sheets; and
  a second solid electrolyte layer contacting the second surface of the second cathode layer and extending across the gaps defined between the adjacent cathode sheets.

27. The structure of claim 26, wherein the first and second electrolyte layers respectively comprise a solid polymer electrolyte layer.

28. The structure of claim 26, wherein the gap defined between adjacent cathode sheets ranges between about 0.015 inches and about 0.4 inches.

29. The structure of claim 26, wherein a width of the cathode sheets ranges between about 0.75 inches and about 24 inches.

30. The structure of claim 26, wherein a length of the cathode sheets ranges between about 0.25 inches and about 24 inches.

31. The structure of claim 26, wherein the first and second solid electrolyte layers respectively encompass a perimeter of the cathode layer of each of the cathode sheets.

32. The structure of claim 26, wherein the respective first and second solid electrolyte layers comprise a first edge and a second edge, and each of the cathode sheets comprises a first edge and a second edge, the first and second edges of the respective first and second solid electrolyte layers extending beyond the first and second edges of each cathode sheet by between about 0.04 inches and about 0.31 inches.

33. The structure of claim 26, wherein the current collector layer comprises a first edge and a second edge, and the respective first and second cathode layers comprise a first edge and a second edge, the first edge of the current collector layer extending beyond the first edge of the respective first and second cathode layers.

34. The structure of claim 33, wherein the first edge of the current collector layer extends beyond the first edge of the respective first and second cathode layers by between about 0.08 inches and about 0.51 inches.

35. The structure of claim 33, wherein the second edge of the current collector layer extends beyond the second edge of the respective first and second cathode layers by between about 0.0 inches and about 0.315 inches.

36. The structure of claim 26, wherein the series of discontinuous cathode sheets is arranged in a plurality of rows to define a matrix of the discontinuous cathode sheets, and a gap defined between adjacent rows ranges between 0 inches and about 0.63 inches.

37. The structure of claim 26, wherein the respective first and second solid electrolyte layers comprise a first edge, the current collector layer comprises a first edge, and the respective first and second cathode layers comprise a first edge, the first edge of the current collector layer extending beyond both the first edge of the respective first and second cathode layers and the first edge of the respective first and second solid electrolyte layers.

38. The structure of claim 37, wherein the first edge of the current collector layer extends beyond the first edge of the respective first and second solid electrolyte layers by between about 0.04 inches and about 0.35 inches.

39. The structure of claim 37, wherein the first edge of the respective first and second solid electrolyte layers extends beyond the first edge of the respective first and second cathode layers.

40. The structure of claim 37, wherein a second edge of the respective first and second solid electrolyte layers extends beyond a respective second edge of the respective first and second cathode layers and current collector layers.

41. The structure of claim 26, wherein the respective first and second cathode layers comprise a cathode active material, an electrically conductive material, an ionically conducting polymer, and an electrolyte salt.

42. The structure of claim 26, wherein the respective first and second cathode layers comprise a vanadium oxide material or a lithiated vanadium oxide material.

43. The structure of claim 26, wherein the respective first and second cathode layers comprise a cathode active material selected from the group consisting of $LiCoO_2$, $LiNiO_2$, $LiMn_2O_4$, $Li[M(1-x)Mnx]O_2$ where $0<x<1$ and M represents one or more metal elements, polyacetylene, polypyrrole, polyaniline, polythiophene, $MoS_2$, $MnO_2$, $TiS_2$, $NbSe_3$, $CuCl_2$, a fluorinated carbon, $Ag_2CrO_4$, $FeS_2$, $CuO$, $Cu_4O(PO_4)_2$, sulfur, and polysulfide.

44. The structure of claim 26, wherein the respective first and second solid electrolyte layers comprise a random polyether copolymer of ethylene oxide and an ether oxide selected from the group consisting of propylene oxide, butylene oxide, and alkylglycidylether.

45. The structure of claim 26, wherein the respective first and second solid electrolyte layers comprise a crosslinked solid ionically conductive polymer comprising urethane groups, urea groups, thiocarbamate groups, or combinations thereof and inorganic particles.

46. The structure of claim 26, wherein the second solid electrolyte layer comprises a first surface and a second surface, the first surface of the solid electrolyte layer contacting the second surface of the second cathode layer, the structure further comprising an anode layer contacting the second surface of the second solid electrolyte layer.

47. The structure of claim 46, wherein the anode layer comprises lithium.

48. The structure of claim 46, further comprising a releasable separator layer contacting the second surface of the first electrolyte layer.

* * * * *

UNITED STATES PATENT AND TRADEMARK OFFICE
CERTIFICATE OF CORRECTION

PATENT NO. : 6,830,846 B2
DATED : December 14, 2004
INVENTOR(S) : Kramlich, David C.

It is certified that error appears in the above-identified patent and that said Letters Patent is hereby corrected as shown below:

Column 10,
Line 9, delete "O<x<1" insert -- 0<x<1 --.
Line 34, delete "application" and insert -- Application --.
Line 36, after "under" insert -- Attorney Docket 56529USA8A, --.

Column 14,
Line 49, after "a" delete "30".

Column 17,
Line 39, delete "0.3 15" and insert -- 0.315 --.

Column 18,
Lines 9 and 12, after "of" insert -- claim --.

Column 20,
Lines 1, 5, 8, 16 and 21, after "of" insert -- claim --.

Signed and Sealed this

Twenty-second Day of November, 2005

JON W. DUDAS
*Director of the United States Patent and Trademark Office*